United States Patent [19]

Tu Xuan

[11] Patent Number: 4,542,329
[45] Date of Patent: Sep. 17, 1985

[54] ENERGIZING METHOD FOR A SINGLE PHASE TIMEPIECE STEPPING MOTOR

[75] Inventor: Mai Tu Xuan, Chavannes, Switzerland

[73] Assignee: Omega SA, Bienne, Switzerland

[21] Appl. No.: 504,346

[22] Filed: Jun. 14, 1983

[30] Foreign Application Priority Data

Jun. 21, 1982 [FR] France ................... 82 11433

[51] Int. Cl.[4] ............................................. H02K 37/00
[52] U.S. Cl. ................................. 318/696; 318/685; 310/49 R; 368/157
[58] Field of Search ............... 318/585, 696; 310/49, 310/40 MM; 368/157

[56] References Cited

U.S. PATENT DOCUMENTS

| 3,736,487 | 5/1973 | Cook et al. ..................... 318/685 |
| 3,760,252 | 9/1973 | Beery ............................. 318/685 X |
| 3,965,406 | 6/1976 | Yablonski ....................... 318/685 |
| 4,081,936 | 3/1978 | Leenhouts et al. ............. 318/685 X |
| 4,346,463 | 8/1982 | Tu Xuan et al. . | |

FOREIGN PATENT DOCUMENTS

| 0021320 | 1/1981 | European Pat. Off. . |
| 2200075 | 4/1974 | France . |
| 2413663 | 7/1979 | France . |
| 2082806 | 3/1982 | United Kingdom . |

OTHER PUBLICATIONS

10th International Congress of Chronometry, pp. 73-80, paper entitled Society de Recherches en Matiere de Micromoteurs Electriques, Sep. 11-14, 1979.

Primary Examiner—Donovan F. Duggan
Attorney, Agent, or Firm—Griffin, Branigan, & Butler

[57] ABSTRACT

An energizing method for a timepiece stepping motor provides just sufficient energy to the motor winding to assure a single step of the rotor with each driving pulse. With each pulse the winding is initially energized at a constant voltage (period $T_1$) then at a constant current (period $T_2$) between two limits Imax and Imin. When the time period $\Delta T_3$ required for the current to pass from Imax to Imin is greater than a reference time period $\Delta T_{ref}$ the energization is terminated.

The invention may be employed in a wristwatch with the purpose of reducing energy consumption and increasing battery life.

12 Claims, 7 Drawing Figures

ENERGIZING METHOD FOR A SINGLE PHASE TIMEPIECE STEPPING MOTOR

The object of the present invention is to provide an energizing method for a timepiece stepping motor adapted to furnish the motor winding with sufficient energy to assure that the rotor steps following each energizing pulse, said motor having a positioning couple Ca, a drag couple Cr and a magnet-to-winding coupling factor k.

BACKGROUND OF THE INVENTION

Several solutions have already been proposed for the energizing of a motor winding with energy just sufficient to assure stepping. For instance in the case as described in Swiss Pat. No. 585 428, whenever during the energizing period of the motor there has been detected a minimum current in the winding, it may be concluded that the rotor will step since this minimum current corresponds to the maximum speed of the rotor. It may however be shown that what has just been said is not always the case and such may be verified from the description and drawings which accompany the French patent application No. 2 459 579. This latter citation proposes to overcome the difficulties by the employment of means based on an integration of the mutual flux difference magnet-to-winding in order to detect whether the rotor has stepped or not. If this arrangement is very sure by virtue of the spread of amplitudes measured between a successful step and a missed step, it presents the difficulty of requiring an integrator provided with a capacitor, this being difficult to miniaturize beyond certain limits. Moreover, this arrangement detects only whether or not the step has been made but does not propose any solution to adapt the length of the motor pulse to the real load which is applied to the motor.

The purpose of this invention thus is to overcome the above cited difficulties and to provide a method for slaving the operation of a stepping motor to the load imposed on its rotor, this in accordance with the definitions in the claims.

DETAILED DESCRIPTION OF THE INVENTION

Figure 1A:
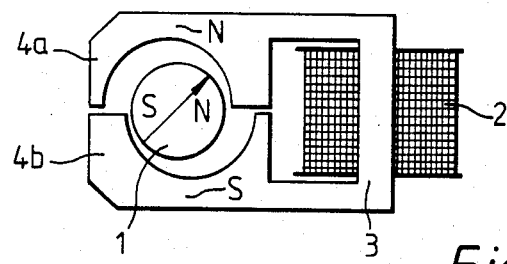
FIG. 1a shows a basic form of a single phase bipolar motor of known type.

FIG. 1 shows a basic form of a single phase bipolar stepping motor. A cylindrical permanent magnet 1 with diametral magnetization SN forms the rotor of this motor. Its stator is formed from a winding 2 which, when excited, produces a magnetic flux which is transmitted to the gap by means of the core 3 and the pole pieces 4a and 4b which are realized in soft ferro-magnetic material. In the stopped position, the rotor occupies the position of minimum reluctance such as shown on FIG. 1a. Should a positive pulse be applied to the winding, the rotor turns through a step, that is to say through 180°; a second pulse, negative this time, permits the rotor to continue its course in the same sense and thus to achieve a further step the sequence continuing thus in the same manner.

Figure 1B:
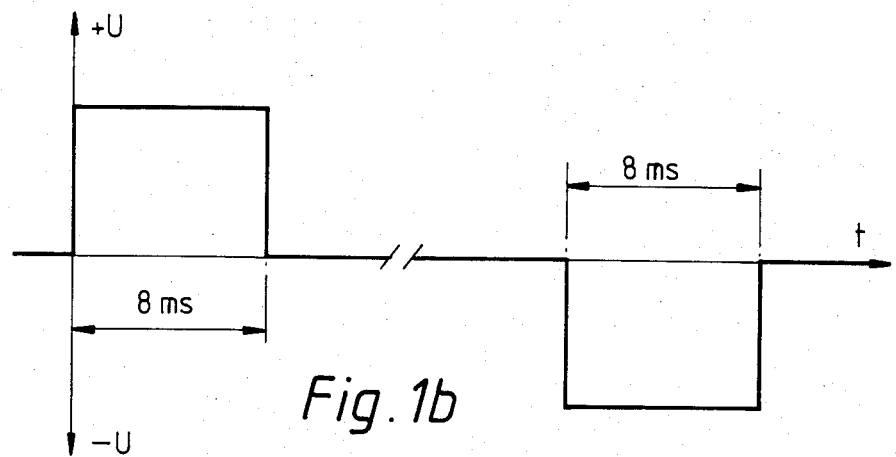
FIG. 1b shows the form of signals applied to this type of motor.

FIG. 1b shows, as a function of time, the alternative polarity pulses which cause the motor to step in a manner as known from the state of the art. The duration of each pulse is chosen to be sufficiently long to ensure that the rotor steps for all loads which may be applicable. This duration is generally on the order of 8 ms.

Figure 1C:
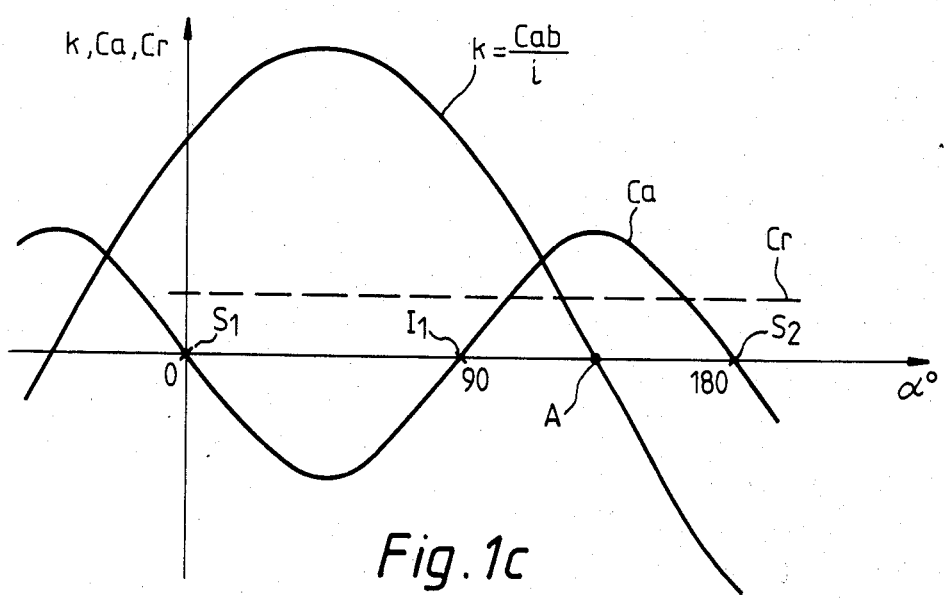
FIG. 1c is a graph representing the positioning couple Ca, the drag couple Cr and the magnet-to-winding coupling factor k of the stepping motor as a function of the angular position $\alpha$ of its rotor.

FIG. 1c calls to mind the couples occurring in a bipolar single phase stepping motor of known type such couples being shown as a function of the angular position $\alpha$ of the rotor. Owing to the action of the rotor magnet alone, there will initially be found a positioning couple Ca. In addition to this and in view of the interaction of the rotor magnetic flux with the winding flux when the latter is energized there will be found a dynamic motor couple Cab represented on FIG. 1c by the magnet-to-winding coupling factor k=Cab/i, where i is the current in the winding. Finally, there will act on the rotor a mechanical drag couple Cr which comprises the useful load couple necessary to cause the mechanisms of the watch to be moved and among others, a friction couple resulting from the bearings in which the axis of the rotor is supported and turns. The figure shows that the motor construction is such that couple Ca and Cab are approximately 45° out of phase with one another. Initially, the rotor is in a position $S_1$. If a positive pulse is applied to the winding and following which the rotor steps, the rotor will be found in position $S_2$ having turned through 180°. The current pulse which generates the mutual couple Cab=k·i thus causes the rotor to move from a first equilibrium point $S_1$ to a second equilibrium point $S_2$ and this in accordance with the equation of motion:

$$J\frac{d\Omega}{dt} = Cab + Ca - Cr \tag{1}$$

where $\Omega$ is the angular velocity of the rotor and J its moment of inertia.

Ordinarily, the winding is energized by a constant voltage pulse coming directly from a source such as a battery. The duration of such pulse is chosen to be sufficiently long to assure that the rotor normally steps. In most cases, the motor is virtually not loaded and operates accordingly. In these cases the drag couple is practically along the axis $\alpha$ and as soon as the rotor has passed the unstable equilibrium point $I_1$ the drive voltage may be interrupted since the rest of the travel from $I_1$ to $S_2$, is brought about by the kinetic and potential energy stored between $S_1$ and $I_1$. There exist however cases where the drag couple is not negligible. Such are shown in FIG. 1c by the value Cr which, in the case given as an example, may be considered as a maximum. In such cases it is necssary to prolong the duration of the pulse at least until the instant where the positioning couple Ca becomes greater that the drag couple Cr. Energization by pulses of constant duration sufficiently long to cover all the cases which may be presented represents a squandering of energy.

From FIG. 1c it will be noted that when the coupling factor k changes sign at point A, positioning couple Ca is greater than the drag couple Cr, this signifying that from this angular position of the rotor, one is assured that the rotor will step even in the absence of energizing current. The present invention makes use of this observation and proposes to detect the passage of the rotor through point A to interrupt energization of the winding at this moment.

The solution to the problem of detection may be found by observing the derivative of current in the motor winding when said winding is short-circuited.

Effectively, the voltage equation of a single phase stepping motor is written:

$$U = ri + L\frac{di}{dt} + k\Omega \quad (2)$$

where:
U = voltage applied at the winding terminals;
r = winding resistance;
L = winding inductance;
$k\Omega = Ui$ = induced voltage produced by rotation of the rotor.

If the winding is short-circuited, U will then euqal 0 and equation (2) becomes:

$$\frac{di}{dt} = -\frac{1}{L}(ri + k\Omega) \quad (3)$$

From the above expression and before the coupling factor k crosses point A, one may see that the current i, the angular velocity and the factor k are all positive. From this there results that the derivative di/dt is strongly negative and that if one establishes a lower threshold Imin as limit below which the current produced by the counter-electromotive force of the motor (Ui) must not fall, such threshold will be attained in a lapse of time very brief counted from the moment when the winding has been short-circuited.

From the same expression (3) will be seen that after crossing point A by the coupling factor k, i and $\Omega$ remain positive while k becomes negative. It results therefrom that the derivative di/dt is initially less negative than in the case considered in the preceding paragraph, may pass through zero if $|k\Omega| = ri$ and even become positive in the case where $|k\Omega| > ri$. Thus a much greater lapse of time will be required for the current developed by the motor to attain the limit Imin as discussed above.

From what preceded, it will be understood that the detection of the arrival of the rotor at point A, which gives assurance that the rotor will step, may be based on the evolution of the derivative di/dt or, if preferred, on the time necessary for the short-circuit current to pass from the value of current measured at the beginning of the short-circuit to a second value which may be established as a lower limit. This necessary time which will be called $\Delta T$ may be compared to the reference period $\Delta T_{ref}$. If $\Delta T$ is equal to or greater than $\Delta T_{ref}$, it may be concluded that the passage of point A has been effected and the energization of the motor winding may then be interrupted.

The method thus consists of energizing the winding between two current limits, at least during a period $T_2$ where one may expect to detect the point of interest A: an upper limit Imax which, as soon as attained leads to a short-circuiting of the winding and a lower limit Imin which, when attained, leads to re-energizing the winding. During this period, the winding thus is energized with an essentially constant current. According to the invention, period $T_2$ is preceded by a period $T_1$ during which the winding is energized at a substantially constant voltage.

Figure 2:
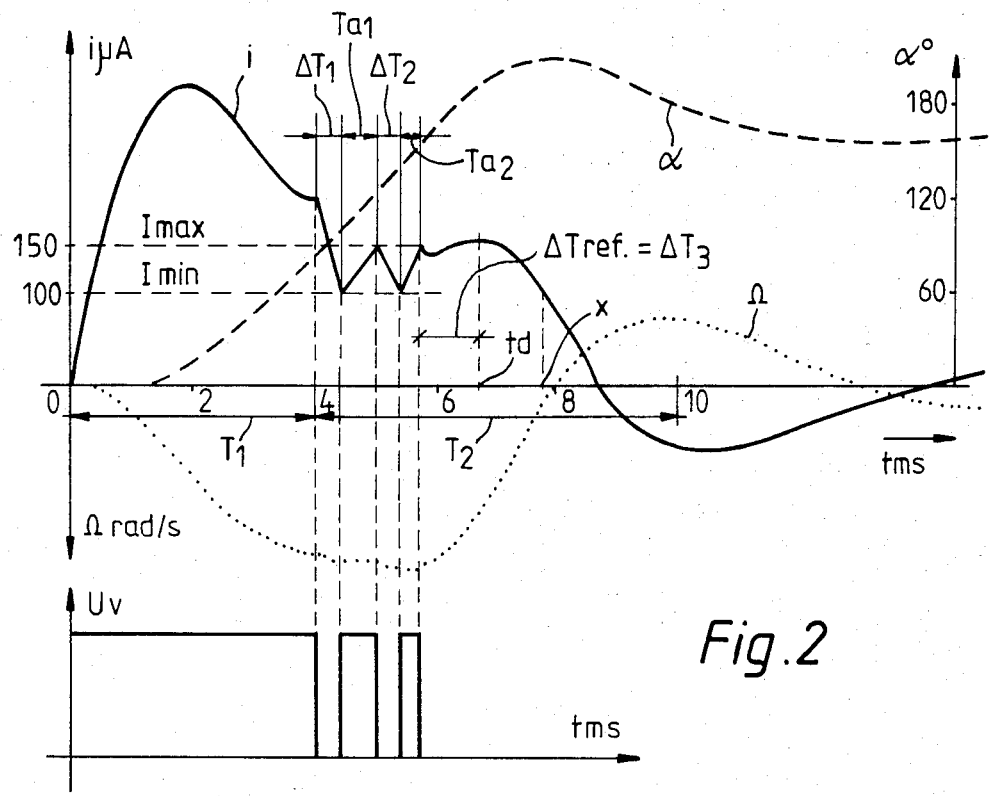
FIGS. 2, 3 and 4 are graphs established to demonstrate various operating conditions of a stepping motor energized according to the method of this invention and which show the current i in the winding, the angular position $\alpha$ of the rotor and the angular speed $\Omega$ as a function of time t.

FIG. 2 is a graph illustrating the method which has just been described. On this will be found expressed as a function of time t, the current i in the winding, the angular position $\alpha$ and the angular velocity $\Omega$ of the rotor.

During a first predetermined period $T_1$, the winding is energized at a constant voltage U. The current which results therefrom depends on the voltage U, on the induced voltage Ui produced by the rotation of the rotor and the resistance r of the winding in accordance with the expression $$i = \frac{U - Ui}{r}$$

At the beginning of the period $T_1$, the current i increases rapidly. Then, as soon as the rotor begins to turn, an induced voltage arises in the winding which has as effect limitation and then decrease of the current. This first phase $T_1$ which lasts 4 ms for the motor taken as an example, has as its purpose to initiate rotation of the rotor. Its duration will depend on the motor under consideration and the various couples associated therewith as may be seen from the motion equation (1) cited above. In the graph of FIG. 2, it will be observed at the end of period $T_1$ the rotor has turned through approximately 80° and at that moment its angular velocity $\Omega$ is close to the maximum.

From the beginning of period $T_2$ energization of the motor enters into a constant current phase established by means which limit this current between two values Imin and Imax chosen here to be at 100 $\mu$A and 150 $\mu$A respectively. Since at the beginning of the period $T_2$ the current i is greater than Imax, the winding is short-circuited until i has attained the value Imin of 100 $\mu$A. Since the time $\Delta T_1$ required for the current to pass from one value to the other is less than the reference time $\Delta T_{ref}$ fixed here at 1 ms, it may be concluded that the passage of point A (FIG. 1c) has not been effected and thus re-energizes the winding (phase Ta$_1$) until this current attains the value Imax of 150 $\mu$A. Thereafter follows a second short-circuit period $\Delta T_2$ followed by a second energization period (phase Ta$_2$) from which once again the winding is short-circuited during the period $\Delta T_3$. During the period $\Delta T_3$, the derivative di/dt, negative during a very short lapse of time, becomes zero and then positive. At the moment when $\Delta T_3 = \Delta T_{ref}$, energization of the winding is interrupted (time td) since it may be concluded that at this moment point A (FIG. 1c) has been passed. If such interruption were not to take place and since period $T_2$ extends from 4 to 10 ms, it will be understood that the winding would be re-energized at time x, which is to say at the moment where the current arrives at 100 $\mu$A, this however being useless and wasteful of energy. Period $T_2$ has a maximum duration of 6 ms in the example shown in FIG. 2, that is to say, for the motor of the example and for the maximum load acting on its rotor, it is known that it will at least have made its step at the end of this period. It is thus useless to maintain the energization means at a constant current beyond said duration.

From what has just been said, it will be understood that the motor has been fed only with energy sufficient to guarantee the stepping thereof in contrast to what has been done up to the present where the voltage is applied for a period sufficiently long to cover all cases of load which may be imposed on the rotor. It will be noted moreover that the consumption is zero during short-circuit periods, this bringing the average consumption to a very low level. On the other hand the limitation by the limit value Imax prevents the current from rising to values which could be prohibitive.

Figure 3:
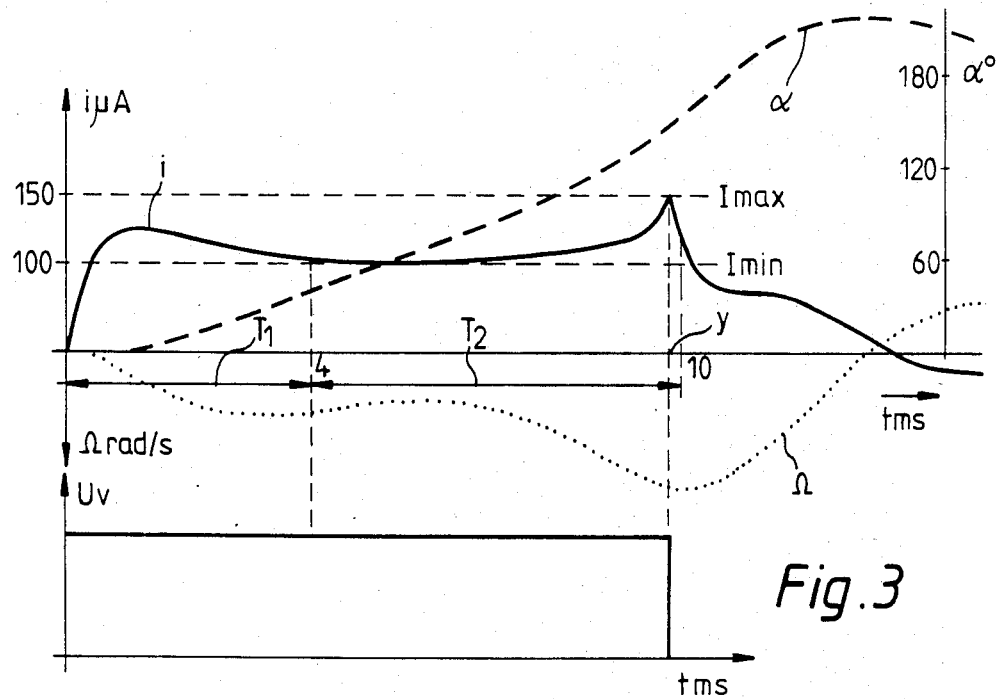

FIG. 3 is a further graph showing the method according to the invention. It concerns a motor for which the resistance r has been greatly increased (from 3'000Ω, as in the case of the motor of FIG. 2, to 5'000Ω) to simulate the increase of resistance of the energization source as may occur for instance in the case of a lithium battery. As in the case studied above the winding is energized at a constant voltage during a fixed period $T_1$ which is here 4 ms. Since at the end of this period the current i is less than the limit value Imax, the winding continues to be energized until the current attains said value Imax which arrives at time y. At this instant the winding is short-circuited as has already been discussed for the preceding case. The graph shows a derivative di/dt which is strongly negative and which thus leads to a re-energization of the winding. Such re-energization however does not take place since a short time lapse after the short-circuiting of the winding, the period $T_2$ comes to an end and one may be certain that the rotor has stepped. Thus, according to the method of the invention, the fact that $\Delta T$ is equal to $\Delta T_{ref}$ is not a necessary condition but rather a sufficient condition to interrupt the energization of the winding. In other words, the failure to re-energize the winding comes about either at the end of the predetermined period $T_2$, or following detection of the passage at point A (FIG. 1c) if the latter detection takes place before the end of said period $T_2$.

Figure 4:
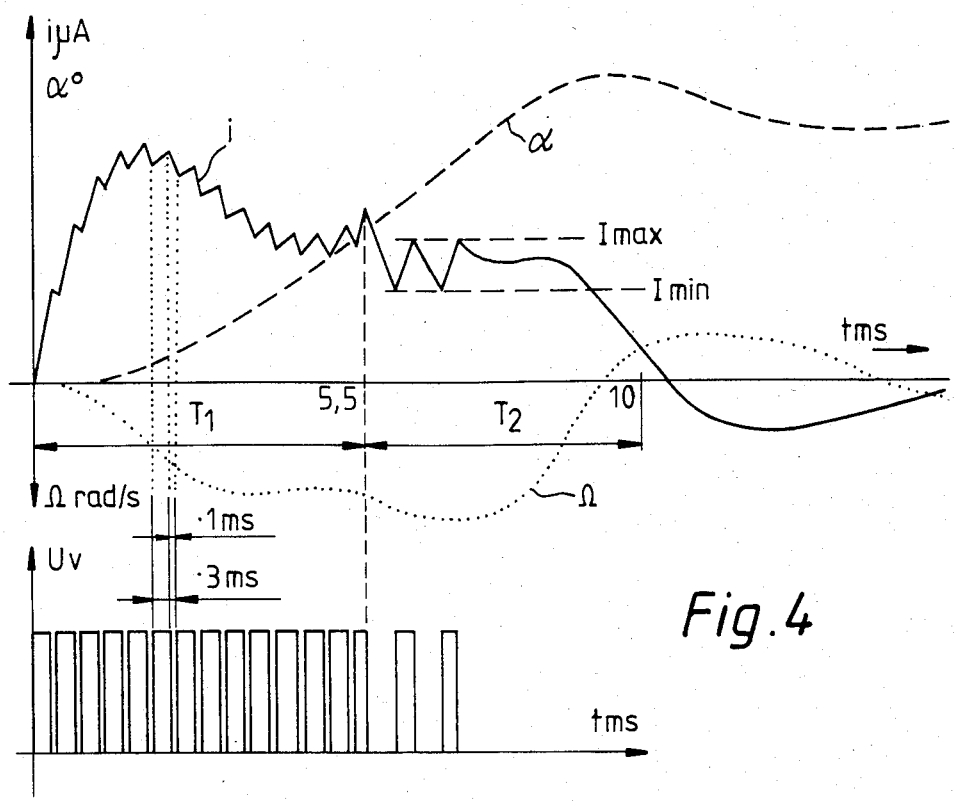

The graph of FIG. 4 shows a variant of the energization of the motor according to the invention. The same method is employed as has already been described. Energization is divided into two portions $T_1$ and $T_2$. During period $T_2$ the winding is energized at a substantially constant current between the two limits Imax and Imin and such energization is interrupted before the end of $T_2$ following detection of the change of sign of the coupling factor k, as has already been discussed in respect of FIG. 2. FIG. 4 shows however during the period $T_1$, that the winding is no longer energized by a voltage of constant amplitude U, but rather by voltage formed by a series of pulses of the same polarity regularly spaced out and having constant amplitude. In the example chosen, each pulse has a duration of 0.3 ms and such pulses are separated from one another by a spacing of 0.1 ms. There results therefrom for current i a curve of saw-tooth form which lasts during the entire first period $T_1$. This manner of proceeding presents at least two advantages: on the one hand, it permits easy adaptation to voltage sources which may vary over wide limits (utilization of a lithium battery for instance for which the voltage may vary from 3 to 1.5 volts), and, on the other hand, prevents that at the end of period $T_1$ the rotor has acquired a too great kinetic energy this leading to an energy loss.

The method such as has been proposed requires that the current developed in the winding be measured. This may be effected through various means, for example by means of an auxiliary winding or a Hall detector or through a resistance placed in series with the winding at the terminals of which the voltage drop may be measured representing the winding current. This last means has been chosen here and will now be explained.

Figure 5:
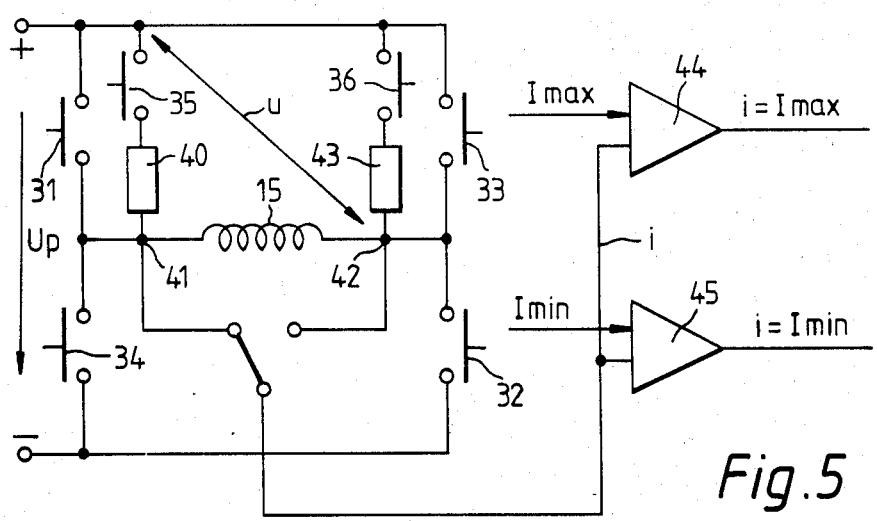
FIG. 5 is a schematic circuit showing one arrangement which enables putting into practice the present invention.

FIG. 5 shows a basic circuit diagram which enables energization of the motor according to the invention. In this arrangement will be found the motor winding 15 and two resistances 40 and 43 which may be placed into the circuit whenever the respective switches 35 or 36 are closed. There will be applied to terminals 41 and 42 alternating control pulses of amplitude U provided by the energization source Up when the switches 31–32 or respectively 33–34 are closed. In the technology employed here these latter are formed of transistors which receive their gating signals from a well-known type of pulse forming circuit. If reference is made back to FIG. 2 and the explanations which have been given in respect thereof, the control sequence may be established in accordance with the table hereinafter for a positive pulse (o=open; f=closed):

|  | Period | Switches |  |  |  |  |  |
|---|---|---|---|---|---|---|---|
|  |  | 31 | 32 | 33 | 34 | 35 | 36 |
|  | $T_1$ | f | f | o | o | o | o |
| $T_2$ | $\Delta T_1$ | o | o | f | o | f | o |
|  | $Ta_1$ | o | f | o | o | f | o |
|  | $\Delta T_2$ | o | o | f | o | f | o |
|  | $Ta_2$ | o | f | o | o | f | o |
|  | $\Delta T_3$ | o | o | f | o | f | o |
|  | $>\Delta T_3$ | f | o | f | o | o | o |

A similar table may be established for a negative pulse. It is then resistance 43 and switch 36 which come into action. Between the positive + energization and one of points 41 and 42 (in accordance with whether one deals with a negative or a positive pulse), there is arranged a double comparator. The first comparator 44 compares current i developed in the winding with the limit current Imax in order to give an output signal as soon as i=Imax, this enabling the sequence $\Delta T_1$, $\Delta T_2$ and $\Delta T_3$ as indicated in the above table. The second comparator 45 operates in an analogous manner and provides an output signal as soon as i arrives at Imin, this enabling the sequence $Ta_1$ and $Ta_2$ from the same table. In the same manner, the circuit is arranged to compare the time durations $\Delta T_1$, $\Delta T_2$, etc., to a reference time $\Delta T_{ref}$ in order to interrupt energization of the winding and to effect the short-circuiting thereof. Such comparator however is not shown on the drawing of FIG. 5. It will be noted that the current comparators may be combined into a single comparator which may be provided with a hysteresis adapted to the limit currents Imin and Imax.

The schematic of FIG. 5 and the above table show that during period $T_2$, the alternation of short-circuiting and re-energization is realized across resistance 40 arranged in series with winding 15. As it is desired that the signal obtained at the terminals of the resistance be of the greatest possible magnitude in order to obtain a suitable voltage at the input of the comparators, there will be chosen for this resistance a value sufficiently high, for example of the same order as that of the winding itself. In this latter case and during the re-energization periods Ta, it may happen that the energy is insufficient to assure rotation of the rotor. To overcome this difficulty it is possible during said periods of re-energization to close intermittently switch 31 in order to short-circuit resistance 40 and thus to obtain full energization at the winding terminals, it being understood that the current measurement takes place during the periods when this switch is open.

FIG. 5 further shows that it is possible during the first period $T_1$ to energize the winding with a series of regularly spaced pulses as has already been discussed in respect to the graph of FIG. 4. It is sufficient in this case to open and close the switch 31 according to the rhythm which has been chosen.

There results from the explanations which have just been given that the present invention brings a new solution to the problem of slaving a watch motor to the various couples which may act thereon, a solution which enables adaptation of the length of the motor pulses to the real load present on the rotor and furnishes the winding with energy just sufficient to cause the rotor to step. The economy of the energy consumption which results therefrom will be evident from the foregoing explanation.

What we claim is:

1. Method of energizing a single phase timepiece stepping motor wherein the motor winding receives with each driving pulse just sufficient energy to assure a single rotor step, said motor exhibiting a positioning couple Ca, a drag couple Cr and a magnet-to-winding coupling factor k, comprising the following steps:
   applying a predetermined voltage of constant amplitude to the motor winding during a first predetermined time period $T_1$ to drive said motor in one direction;
   following said first time period causing a substantially constant current to flow through the motor winding during a second time period of a predetermined maximum duration $T_2$ at the end of which the rotor will have reached an angular position such as to assure completion of its step, said substantially constant current being applied to said motor winding in a sense to drive said motor in said one direction; and
   interrupting energization of the winding at the end of said second time period.

2. Method of energizing a single phase timepiece stepping motor wherein the motor winding receives with each driving pulse just sufficient energy to assure a single rotor step, said motor exhibiting a positioning couple Ca, a drag couple Cr and a magnet-to-winding coupling factor k, comprising the following steps:
   applying a predetermined voltage at the motor winding during a first predetermined time period $T_1$;
   following said first time period applying to the motor winding a substantially constant current during a second time period of a predetermined maximum duration $T_2$ at the end of which the rotor will have reached an angular position such as to assure completion of its step;
   during said second time period detecting if and when the coupling factor k changes sign, the instant td of such detection indicating that the rotor has reached said angular position; and
   interrupting energization of the winding at said instant td.

3. Method of energizing a stepping motor as set forth in claim 2 wherein said predetermined voltage is of constant amplitude.

4. Method of energizing a stepping motor as set forth in claim 2 wherein said predetermined voltage is in the form of a series of regularly spaces pulses of constant amplitude.

5. Method of energizing a stepping motor as set forth in claim 2 including the further steps of:
   comparing the current in the winding during said second time period $T_2$ with a first limit value Imax and a second limit value Imin < Imax;
   developing a first comparison signal when said current is equal to or greater than said first limit value; and
   developing a second comparison signal when said current is equal to or less than said second limit value.

6. Method of energizing a stepping motor as set forth in claim 5 wherein initial development of the first comparison signal provokes the steps of:
   short-circuiting the winding until said current reaches said second limit value;
   re-energizing the winding until said current again reaches said first limit value Imax;
   again short-circuiting the winding until said current reaches said second limit value;
   continuing thus to energize and short-circuit the winding successively;
   measuring the time interval $\Delta T$ for the current to pass from each of the first to the immediately following second limit values;
   comparing said time interval to a reference time period $\Delta T_{ref}$; and
   ceasing energization of the winding as soon as said time interval $\Delta T$ becomes equal to or greater than said reference time period $\Delta T \geq \Delta T_{ref}$.

7. Method of energizing a stepping motor as set forth in claim 5 wherein initial development of the second comparison signal provokes the steps of:
   maintaining energization of the winding until said current reaches said first limit value Imax;
   short-circuiting the winding until the current reaches said second limit value Imin;
   re-energizing the winding until the current again reaches said first limit value;
   continuing thus to short-circuit and energize the winding successively;
   measuring the time interval $\Delta T$ for the current to pass from each of the first to the immediately following second limit values;
   comparing said time interval to a reference time period $\Delta T_{ref}$; and
   ceasing energization of the winding as soon as said time interval $\Delta T$ becomes equal to or greater than said reference time period $\Delta T \geq \Delta T_{ref}$.

8. Method of energizing a stepping motor as set forth in claims 6 or 7 including the step of maintaining the winding short-circuited in the time lapse between the instant when said time interval becomes equal to or greater than said reference time period and the arrival of the succeeding motor driving pulse.

9. Arrangement for energizing a stepping motor in accordance with the method as set forth in claim 1 comprising measuring means arranged to measure the current in the motor winding during the second time period and comparator means coupled to said measuring means and arranged and adapted to maintain a substantially constant current in said winding during said second time period.

10. Method of energizing a single phase timepiece stepping motor wherein the motor winding receives with each driving pulse just sufficient energy to assure a single rotor step, said motor exhibiting a positioning couple Ca, a drag couple Cr and a magnet-to-winding coupling factor k, comprising the following steps:

applying a predetermined voltage comprising a series of regularly spaced pulses of constant amplitude to the motor winding during a first predetermined time period $T_1$ to drive said motor in one direction;

following said first time period causing a substantially constant current to flow through the motor winding during a second time period of a predetermined maximum duration $T_2$ at the end of which the rotor will have reached an angular position such as to assure completion of its step, said substantially constant current being applied to said motor winding in a sense to drive said motor in said one direction; and interrupting energization of the winding at the end of said second time period.

11. Arrangement for energizing a stepping motor in accordance with the method as set forth in claim 2 comprising measuring means arranged to measure the current in the motor winding during the second time period and comparator means coupled to said measuring means and arranged and adapted to maintain a substantially constant current in said winding during said second time period.

12. Arrangement for energizing a stepping motor in accordance with the method as set forth in claim 10 comprising measuring means arranged to measure the current in the motor winding during the second time period and comparator means coupled to said measuring means and arranged and adapted to maintain a substantially constant current in said winding during said second time period.

* * * * *